US007016441B1

(12) United States Patent
Naoe

(10) Patent No.: US 7,016,441 B1
(45) Date of Patent: Mar. 21, 2006

(54) BIT SYNCHRONIZING CIRCUIT

(75) Inventor: Hitoshi Naoe, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 776 days.

(21) Appl. No.: 09/593,945

(22) Filed: Jun. 15, 2000

(30) Foreign Application Priority Data

Jun. 15, 1999 (JP) ............................... P11-167658

(51) Int. Cl.
*H04L 7/00* (2006.01)

(52) U.S. Cl. ....................................... 375/354; 327/141

(58) Field of Classification Search ........ 375/354–377, 375/731; 370/503, 516; 327/141, 144, 153, 327/157, 148, 161
See application file for complete search history.

(56) References Cited

U.S. PATENT DOCUMENTS

| | | | | |
|---|---|---|---|---|
| 5,237,290 | A | 8/1993 | Banu et al. | |
| 5,657,318 | A | 8/1997 | Ohmori et al. | |
| 5,887,040 | A | 3/1999 | Jung et al. | |
| 6,044,122 | A * | 3/2000 | Ellersick et al. | 375/360 |
| 6,373,911 | B1 * | 4/2002 | Tajima et al. | 375/375 |
| 6,373,913 | B1 * | 4/2002 | Lee | 375/376 |

FOREIGN PATENT DOCUMENTS

| | | |
|---|---|---|
| JP | 6-53950 | 2/1994 |
| JP | 7-193562 | 7/1995 |
| JP | 9-36849 | 2/1997 |
| JP | 9-181713 | 7/1997 |
| JP | 10-247903 | 9/1998 |

OTHER PUBLICATIONS

"Phase-Locked Loops-Design, Simulation, and Applications", Roland E. Best, *The Classical Digital PLL* (*DPLL*), pp. 156-163, 1997.
"A CMOS Serial Link for Fully Duplexed Data Communication", Kyeongho Lee et al., *IEEE Journal of Solid-State Ciruits*, vol. 30, No. 4, pp. 353-364, Apr. 1995.

* cited by examiner

*Primary Examiner*—Jean B. Corrielus
(74) *Attorney, Agent, or Firm*—Birch, Stewart, Kolasch & Birch, LLP

(57) ABSTRACT

An object of the invention is to provide a bit synchronizing circuit of high quality comprising a bit synchronizing circuit used in a reception circuit for serial communication having a polyphase clock generation circuit for generating a plurality of clocks which are out of phase with each other by a substantially regular interval, based on an input clock and a detection circuit for detecting which clock has a phase shift of an integral multiple of a clock cycle among the clocks generated by the polyphase clock generation circuit with respect to the input clock.

15 Claims, 9 Drawing Sheets

BIT SYNCHRONIZING CIRCUIT

BACKGROUND OF THE INVENTION

1. Field of the Invention

The present invention relates to a bit synchronizing circuit used in a receiver for high speed serial communication represented by the IEEE 1394; the ATM (asynchronous transfer mode), the space light communication or the like.

2. Description of the Related Art

Along with digitization of an information apparatus, high speed serial communication of digital signals have been widely used for applications ranging from data transfer between LSIs to radio communication or optical fiber commutation.

In such digital communication, it is necessary to send timing information for sampling data correctly in addition to communication data. In many cases, high speed serial communication does not use a separate line for the timing information from the line for the data in order to maintain a low number of communication lines. Instead, the data is made to have a redundancy and coding is used so that the data is secured to be transferred within a certain cycle of time. Because the transfer of the data itself is the timing information, the data can be correctly recovered, based on the transfer of the data, on the receiver end in the case where the intervals between the transfers are short enough. A circuit to realize this is called a bit synchronizing circuit or a symbol synchronization circuit.

In recent years in high speed serial communication a system called burst mode communication for sending and receiving data intermittently such as a time division system of a dual line type subscriber line system in ISDN (integrated services digital network) and other types of semi-dual communication have been developed. In burst mode communication a particular pattern called a preamble is usually transferred before the data to be transferred is transferred in order to establish bit synchronization. Because the data to be transferred cannot be sent during the cycle of the preamble, the shorter the preamble is the more effective the communication is. To shorten the preamble it is important for the technology of the bit synchronizing circuit to establish synchronization at high speed.

In addition, in the case of such a system as to convert signals using an amplifier such as optical fiber communication or radio communication, a bias may arise in the pulse width of the signals until the amplifier is stabilized. A signal waveform of the transmission and reception when that phenomenon occurs is shown in FIG. 11. In FIG. 11, the transmitted signal represents changes in outputs of the transmitter with time. In FIG. 11 is shown a repetitive pattern 0 and 1 used frequently as a preamble. For example, in the case of optical fiber communication, an LED or laser outputs optical signals based on this transmitted signal.

The received signal as shown in FIG. 11 is an example of a signal which is amplified and processed after a light signal is received by a light receiving element. Depending on the characteristics of the amplifier or the like on the reception end, the cycle where the signal is high becomes long as compared to the transmitted signal while the cycle of low is shortened at the lead of received signal. This tendency becomes smaller while continuing the reception of the signal, which gradually approaches to a waveform of the transmitted signal. To eliminate the influence of the bias of this received signal, it is necessary to further add a preamble. In order to correspond to such a case, a bit synchronizing circuit becomes important to carry out correct synchronization even in the case where the pulse width is biased.

As for prior art to gain such a bit synchronization the following three types are known.

A first technology uses a PLL (phase-locked loops) as disclosed in “Phase-Locked Loops—Design, Simulation, and Applications” Third Edition, Roland E. Best, 1997, McGraw-Hill. In this technology a voltage-controlled oscillator is used to generate a clock on the reception end. The voltage-controlled oscillator is of such a type that outputted clock rate can be changed by changing the operating voltage. The PLL controls the rate of the voltage-controlled oscillator so that the transfer point of the received signal and the transfer point of the clock coincide by using the phase difference between the transfer point of the received signal and the generated clock. In this way, by sampling the received data, with the clock synchronized with the received signal, the signals can be correctly received.

In general, the bit synchronizing circuit which generates a clock synchronized with a received signal on the reception end is generally called a clock recovery system. In the case where the clock recover system is applied for the bit synchronizing circuit, since the received data is synchronized with the clock synchronized with the received signal, an asynchronous FIFO (first in first out) is usually used so as to synchronize the received data with the system clock to the receiver. The received signal is written into the asynchronous FIFO with the clock synchronized with the received signal and by reading out with the system clock of the receiver, it possible to have a synchronization with the system clock of the receiver.

A second technology uses a high speed clock which samples data with a significantly fast clock compared to the bit rate and which determines the sample timing for reception according to the timing of change in sample data value. The UART (universal asynchronous receiver ard transmitter) which is a serial controller of a PC uses this method. In the UART a data format called an asynchronousness is used. Usually, in the asynchronousness a start bit is added in the front and a stop bit is added at the end for each eight bits of data. The start bit is always 1 while the stop bit is always 0. The received signal is sampled with a clock of 16 times the bit rate and at the time point when the sample data changes from 0 to 1, that is to say, when the start bit begins, the 4 bit counter is initialized. The sample data when the counter turns to 8 is stored for 8 times so as to confirm that the next stop bit is 0 to be outputted as received data.

A third technology uses switching of two oscillators as described in Japanese Unexamined Patent Publication JP-A 6-53950 (1994). Following the high and low of the received signal, the operation of two oscillators are alternatively started with the operation. The two oscillators start the operation at the surge or the drop of the received signal, respectively, therefore their outputs are synchronized with the received signal. By taking OR of the outputs of the two oscillators, a clock synchronized with the received data is generated. In this technology the asynchronous FIFO described in the first technology is also necessary.

However, there exist the following problems with the above described first to third technologies.

In the first technology, since it takes time for the synchronization, a long preamble is necessary in front of the data. Additionally because the first technology includes an analog circuit, it is difficult to mass-produce at low cost.

In the second technology, in the case of high speed communication of 100 Mbps to a few Gbps, a clock frequency of several hundreds MHz or more is required, which is not suitable for mounting in an inexpensive CMOSLSI.

In the third technology since the clock is instantaneously synchronized with the edge of the data, the fluctuation of the received signal directly leads to the fluctuation of the clock as it is. In the case where the fluctuation is large, it is necessary to operate the asynchronous FIFO at high speed which is required for the clock recovery system.

Therefore, the following fourth to sixth technologies are proposed in addition to those described above.

A fourth technology selects a polyphase clock, that is, a clock with the closest phase to that of the received data among a plurality of clocks with shifted phases (see Japanese Unexamined Patent Publication JP-A 7-193562 (1995), Japanese Unexamined Patent Publication JP-A 9-181713 (1997), Japanese Unexamined Patent Publication JP-A 10-247903 (1998) or the like). In those publications, a mounting method for selecting a clock with the closest phase to the transfer point of the received signal among polyphase clocks is disclosed. In this technology the asynchronous FIFO described in the first technology is also necessary.

A fifth technology attempts to accelerate the rate of asynchronousness (see "A CMOS Serial Link for Fully Duplexed Data Communication," K. Lee, et al., IEEE Journal of Solid-State Circuits, Vol. 30, No. 4, April 1995 or the like). In this technology a polyphase clock with a speed of one tenth of the bit rate is used so as to enhance parallelization to implement high speed communication of 500 Mbps. More concretely, 40 clocks of one tenth with equally shifted phases are used. By re-sampling the data sampled by those clocks with a single clock, the information equal to that gained by sampling the duration of a 10 bit time with a rate four times as fast as the bit rate can be gained with intervals of 50 MHz.

By inputting the data to an edge detection circuit, a changing point from 0 to 1 is detected. Actually this technology presumes that to transmit a preamble in the form of 1111100000 in front of the data to be sent at least three times, and during this term, only one part for one time of sampling, that is to say, only at the lead of the start bit changes from 0 to 1. Thereby, it is possible to specify the position of the start bit. Even after the data starts to be transmitted and received after the preambles are finished, the edge of the start bit emerges at almost the same part and, therefore, a circuit is incorporated so that the edge within the data is ignored and the edge of the start bit is trailed.

As described above, the position of the edge of the start bit can be specified while receiving the data, 4 samples each from there are regarded as corresponding to each bit. A value of each bit is determined by a majority decision of the corresponding 4 samples.

A sixth technology uses an over-sampling as described in, for example, Japanese Unexamined Patent Publication JP-A 9-3849 (1997). In this technology, the result of sampling the received signal with a faster rate than the bit rate is parallelized at the same rate as the bit rate in order to gain the data, which is then processed. More concretely, changing points are sampled from parallel data to select sample data regarded as reception data from the number and the position of changing points within the parallel data.

In the fourth technology described above, a clock is selected from the edge information from the received signal, and the received signal is sampled with that selected clock, therefore a polyphase clock is necessary where phases are delayed to the same extent as the divided bit rate so as to fit to a designed circuit and the circuit for generating the clock is also necessary.

In the fifth and sixth technologies described above, a polyphase clock with proper delays is also necessary.

Accordingly, a bit synchronizing circuit of high quality is desired which is suitable for the fourth to sixth technologies as described above.

SUMMARY OF THE INVENTION

An object of the invention is to provide a bit synchronizing circuit of high quality.

The invention provides a bit synchronizing circuit used for a reception circuit for serial communication, comprising a polyphase clock generation circuit for generating a plurality of clocks which are out of phase with each other by a regular interval, based on an input clock and a detection circuit for detecting which clock has a phase shift of an integral multiple of a clock cycle among the clocks generated by the polyphase clock generation circuit with respect to the input clock.

According to the invention, since the bit synchronizing circuit comprises the polyphase clock generation circuit and the detection circuit as described above, such a configuration can be realized that the amount of phase shift (delay amount) of the polyphase clock is detected and the amount of the phase shift (delay amount) of the polyphase clock is optimized based on this detection, with the result that a bit synchronizing circuit of high quality can be achieved. Accordingly, it becomes possible to implement a bit synchronizing circuit of high quality which is suitable for the fourth to sixth technologies described above.

Furthermore, in the bit synchronizing circuit of the invention, the polyphase clock generation circuit is formed by connecting a plurality of delay circuits which delay the input clock by almost the same amount of time.

According to the invention, since the polyphase clock generation circuit comprises a plurality of delay circuits, a bit synchronizing circuit of high quality as described above can easily be implemented.

Furthermore, the bit synchronizing circuit of the invention comprises a logic circuit to which an output from the detection circuit is inputted and a latch circuit to which an output from the logic circuit is inputted and of which an output is inputted to the logic circuit.

According to the invention, because of the configuration comprising the logic circuit and the latch circuit as described above it is determined which clock has a phase shift of a cycle of the bit rate or a cycle of the clock, based on the value which is latched, with the result that a stable circuit configuration in which, when metastability occurs, an unstable operation due to the occurrence of metastability hardly occurs is realized by performing an operation several times in the logic circuit and passing through the latch circuit.

In addition, in the bit synchronizing circuit of the invention, the data of the latch circuit is cleared according to a constant timing.

According to the invention because of the configuration which can clear the data of the latch circuit according to a constant timing, it becomes possible to acquire the present condition.

Furthermore, the bit synchronizing circuit of the invention comprises an operational circuit for sampling an output from the detection circuit a plurality of times and carrying out operations on sampled values.

According to the invention because of the configuration comprising the operational circuit as described above, based on the operational result of the operational circuit it can be determined which clock has a phase shift of a cycle of the bit or a cycle of the clock so as to implement a stabilized circuit configuration in which, when metastability occurs, an unstable operation due to the occurrence of metastability hardly occurs, by performing an operation in the operational circuit.

Furthermore, in the bit synchronizing circuit of the invention, the output from the detection circuit is maintained for a constant cycle time and is updated at each constant time unit.

According to the invention, because of the configuration which maintains the output from the detection circuit for a constant cycle of time and updates this output at each constant time unit, the output from the detection circuit can be prevented from being modified frequently because of disturbance factors such as noise, therefore, such a change which causes inconvenience cannot be frequently modified to gain the stable operation of the circuit.

Furthermore, in the bit synchronizing circuit of the invention, the output from the detection circuit is held at the time of bit data reception.

According to the invention because of the configuration which holds the output from the detection circuit at the time of bit data reception a stabilized operation of the circuit can be gained at the time of bit data reception.

Furthermore, the bit synchronizing circuit of the invention comprises a plurality of bit synchronous working circuits to which a polyphase clock is inputted from the polyphase clock generation circuit so that a bit synchronizing operation is carried out at each different phase, and a selecting circuit for selecting outputs from the plurality of bit synchronous working circuits, based on the detection result of the detection circuit.

According to the invention because of the configuration comprising a plurality of bit synchronous working circuits and the selecting circuit as described above, the selecting circuit can select which bit synchronous working circuit is utilized based the detection result of the detection circuit so as to easily optimize the amount of phase shift (delay amount) of a polyphase clock.

Furthermore the bit synchronizing circuit of the invention comprises a clock selecting circuit to which a polyphase clock is inputted from the polyphase clock generation circuit and which selects an outputted polyphase clock based on a detection result from the detection circuit.

According to the invention, because of the configuration comprising a clock selecting circuit as described above, the bit synchronous working circuit which carries out a bit synchronizing operation is connected to the last stage of the clock selecting circuit, and the clock of the phase which is necessary for the operation of that bit synchronous working circuit is outputted from the clock selecting circuit, with the result that the circuit configuration can be simplified to reduce the cost because the bit synchronizing circuit can be configured from a single bit synchronous working circuit.

Because any of the configurations according to the invention as described above can be configured from digital circuits, therefore a bit synchronizing circuit of high quality can be implemented at low cost.

As described above, according to the invention, a polyphase clock can be generated by digital circuits and by providing a sensing circuit for sensing the delay amount an inexpensive bit synchronizing circuit can be implemented.

In addition, a stable bit synchronizing circuit which is resistant to metastability or disturbance noise can be implemented.

And, according to the invention, even in the case where the amount of phase shift of the polyphase clock generation circuit (delay amount of each delay circuit) is out of the designed value, a stable bit synchronizing circuit can be formed through the logical operation of a correction circuit or by dealing with the shift of delay amount due to the unevenness of manufacture or fluctuation of the delay amount due to a change in temperature.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
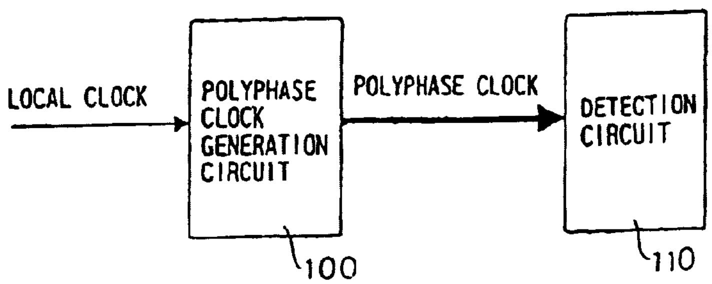
FIG. 1 is a block diagram showing a schematic configuration of a bit synchronizing circuit of the first embodiment according to the invention.

Now referring to the drawings, preferred embodiments of the invention are described below.

First Embodiment

A schematic configuration of a bit synchronizing circuit of the first embodiment according to the invention is shown in a block diagram of FIG. 1.

As shown in FIG. 1, the bit synchronizing circuit of the present embodiment comprises, in a bit synchronizing circuit used in a reception circuit of serial communication, a polyphase clock generation circuit 100 which generates a plurality of clocks which are out of phase with each other by a regular interval, based on an input clock and a detection circuit 110 which detects which clock has a phase shift of an integral multiple of a clock cycle among the clocks generated by the polyphase clock generation circuit with respect to the input clock.

Figure 2:
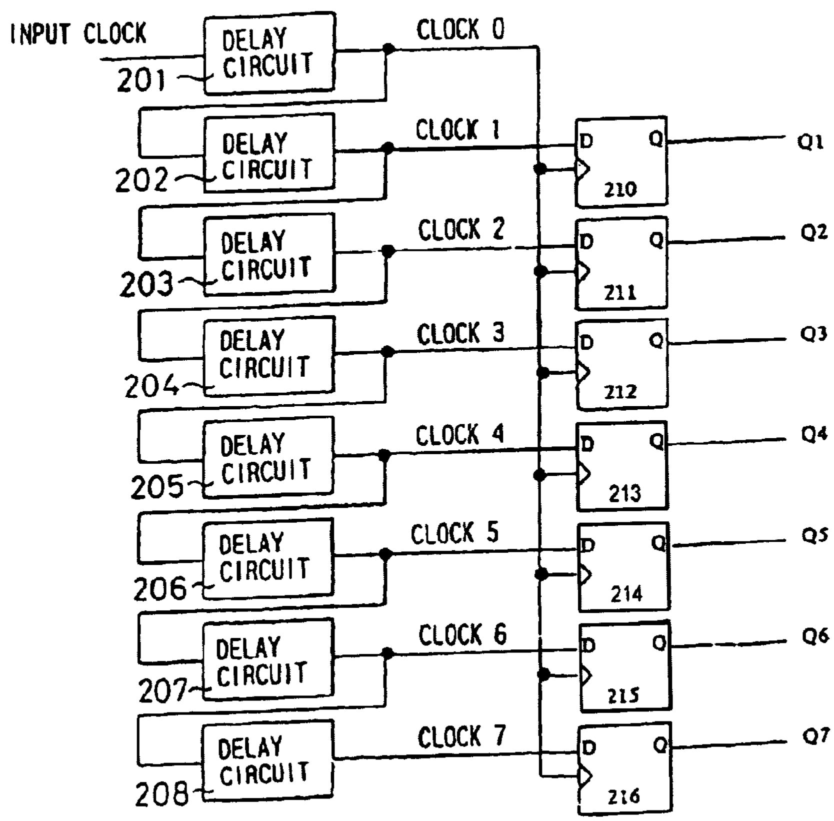
FIG. 2 is a block diagram showing a circuit configuration, in more detail, of the bit synchronizing circuit of FIG. 1.

A more detailed circuit configuration of the embodiment is shown in a block diagram of FIG. 2.

As shown in FIG. 2, in this circuit configuration, the polyphase clock generation circuit 100 of FIG. 1 comprises a plurality of delay circuits 201 to 208 connected to each other which delay the input clock by almost the same cycle of time so that a polyphase clock, clock 0 to clock 7, is gained by sequentially delaying the local clock which is the input clock of the delay circuit 201. A detection circuit 110 of FIG. 1 is constructed from D flip-flops 210 to 216. In the embodiment, the detection circuits 201 to 208 have eight stages so that an eight phase clock (clock 0 to clock 7) is outputted and is detected in one cycle of the clock, which is described in this document, although the invention is not limited to this.

Figure 3:
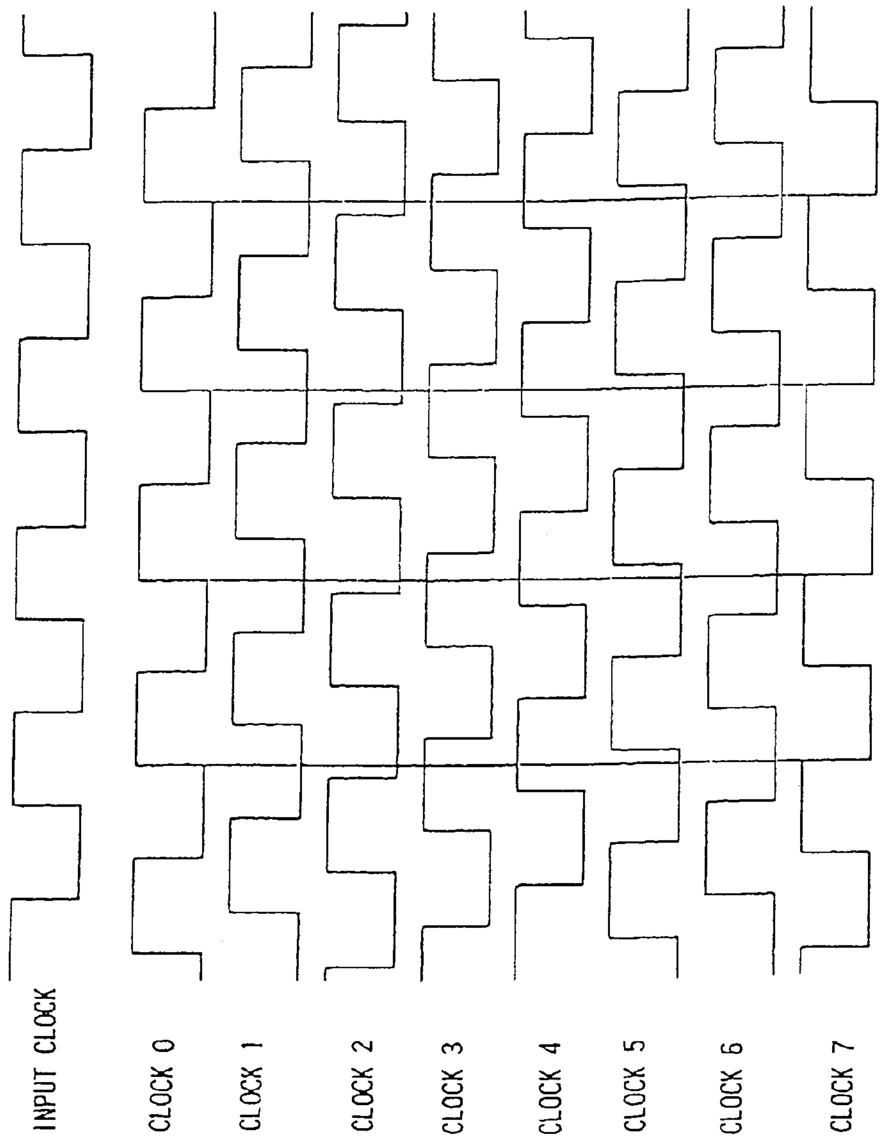
FIG. 3 is a diagram showing a clock waveform of a polyphase clock with the configuration of FIG. 2.

Here, for example, as shown in a clock waveform diagram of FIG. 3, such a clock as the input clock is assumed to be inputted to the delay circuit 201. The output from the delay circuit 201 is outputted as the clock 0 which is gained by delaying the input clock. By inputting the clock 0 to the delay circuit 202 the clock 0 is delayed so as to output the clock 1. In this way clocks from 2 to 7 are produced (generated).

As one of the methods to investigate how many clocks produced by those delay circuits can make a phase shift of the clock cycle, D flip-flops 210 to 216 are utilized. As an input to the D flip-flops 210 to 216, clocks 1 to 7 are utilized respectively. The clock 0 is utilized as the clock to operate those D flip-flops 210 to 216. By having such an operation the outputs Q's of the respective flip-flops 210 to 216 show the values Q1=0, Q2=0, Q3=1, Q4=1, Q5=0, Q6=0 and Q7=1 as shown in FIG. 4.

Figure 4:
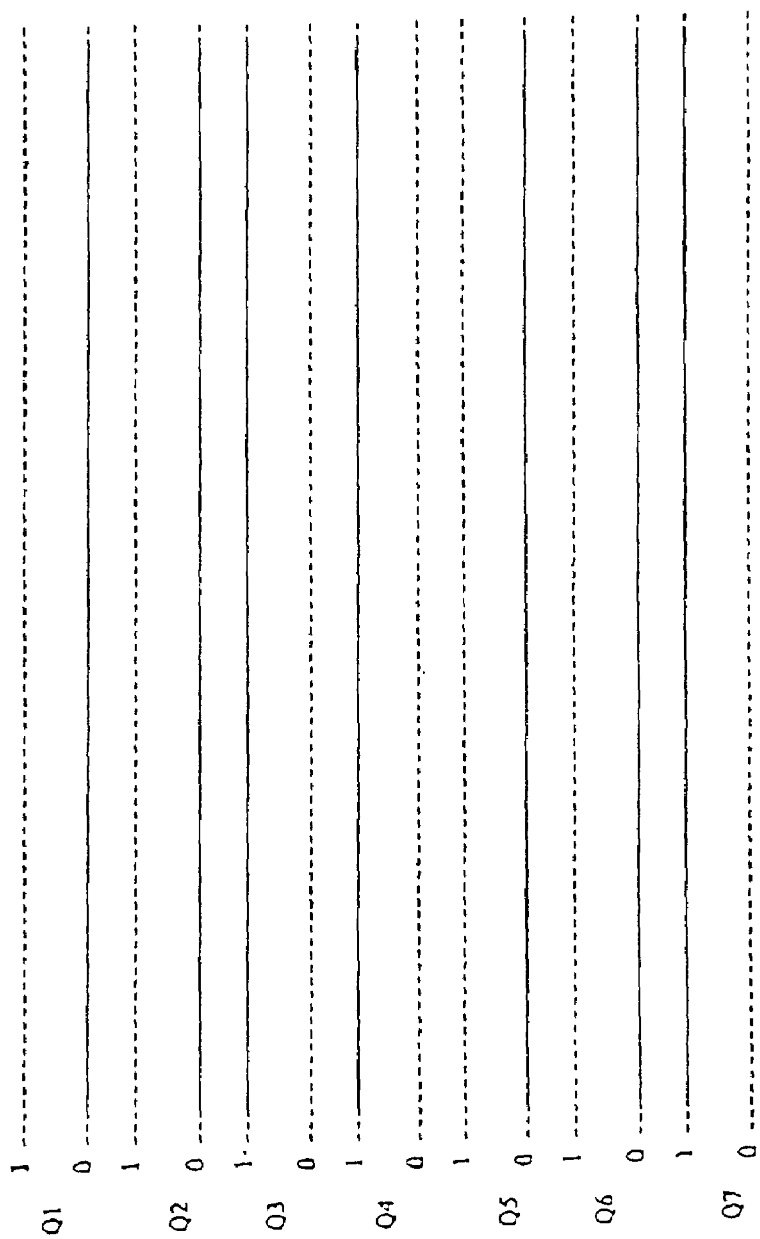
FIG. 4 is a diagram showing the output from the detection circuit with the configuration of FIG. 2.

Following the outputs of those D flip-flops 210 to 216 from Q1 to Q7 sequentially, the clock delay becomes one cycle of the clock at the place where 1 turns to 0 for the first time which is between Q4 and Q5 in FIG. 4. That is to say, the clock 0 to the clock 4 makes a polyphase clock which divides one cycle of the clock. In this way it becomes possible to measure the amount of the delay of the delay circuit.

Therefore, according to the embodiment, since the configuration is provided with the polyphase clock generation circuit 100 and the detection circuit 110 as described above, the phase shift amount (the amount of the delay) of the polyphase clock can be detected. Based on the detection result, the phase shift amount (the amount of the delay) of the polyphase clock can be optimized to realize a bit synchronizing circuit of high quality which is suitable for, for example, the above described fourth to sixth technologies. In addition, since the polyphase clock generation circuit 100 is constructed with a plurality of delay circuits 201 to 208 as described above, a bit synchronizing circuit of high quality can be easily implemented.

Second Embodiment

In the configuration of the first embodiment as shown in FIG. 2, in the case where the input clocks to the D flip-flops 210 to 216 and the transition of data are close to each other, there may be a case where metastability occurs when the amount of the delay is measured.

Here, the metastability is described. To operate a D flip-flop (latch circuit) normally, it is necessary to maintain the inputted data at a constant value for a certain cycle of time just before and after the clock. In the case where inputted data is charged during this determined cycle of time, there is a possibility where the D flip-flop (latch circuit) may output an unstable value which is not either 0 or 1, which phenomenon is called metastability. Such metastability may become a cause of malfunction of the circuit therefore it is desirable to maintain a stable operation even when such metastability occurs.

Therefore, as the second embodiment a circuit configuration for maintaining a stable operation even when such metastability occurs is described.

Figure 5:
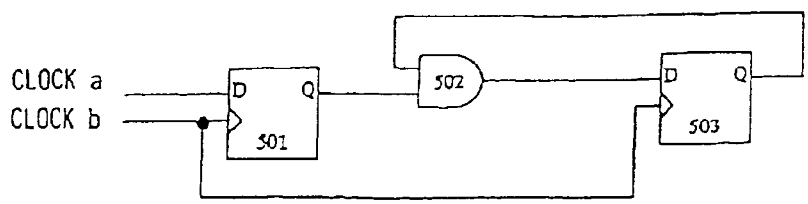
FIG. 5 is a block diagram showing a schematic configuration of a bit synchronizing circuit of the second embodiment.

A schematic configuration of the second embodiment is shown in a block diagram of FIG. 5. As shown in FIG. 5, this configuration comprises a logic circuit 502 to which the output from the detection circuit 501 (corresponding to the D flip-flops 210 to 216 of FIG. 2 according to the above described embodiment) is inputted and a latch circuit 503, to which the output from the logical product circuit 502 is inputted, of which the output is inputted to the logic circuit 502. In FIG. 5, as for clocks a and b, the clock b corresponds to the clock 0 of FIG. 2 and the clock a corresponds to the clocks 1 to 7 of FIG. 2.

That is to say, the output from the detection circuit 501 (corresponding to the D flip-flops 210 to 216 of FIG. 2 according to the above described first embodiment) and the output from the latch circuit 503 are inputted to the logical product circuit 502, in which a logical product operation is carried out several times, and the latch circuit is passed, whereby an unstable operation due to the occurrence of metastability is suppressed or stabilezed. Based on the latched value as described above in the configuration of this embodiment, it is determined what clock has a phase shift of a cycle of the bit rate or the cycle of the clock.

Though the configuration as shown in FIG. 5 is provided with one logical product circuit 502 and one latch circuit 503 for each individual detection circuit 501, in the case where a plurality of detection circuits exist, as in the configuration as shown in FIG. 2, a logical product circuit and a latch circuit may be provided corresponding to respective detection circuits.

There is also the possibility that the present precise value may not be maintained when the latching continues in such a way as described above. To prevent this, the data of this latch is cleared periodically at set intervals to be able to maintain the present condition.

As described above, according to this embodiment, the configuration provided with a logical product circuit 502 and a latch circuit 503 as described above can determine what clock has a phase shift of a cycle of the bit rate or the cycle of the clock, based on the latched value, and can realize a stable circuit configuration in which, when metastability occurs, an unstable operation due to the occurrence of metastability hardly occurs, by performing an operation several times in the logical product circuit 502 and passing through the latch circuit 503. In addition, in the case where the configuration clears the data of the latch circuit 503 according to certain timing, the present condition can be maintained.

Third Embodiment

As the third embodiment, a different configuration from that of the second embodiment described above which can achieve a stable operation even when metastability occurs is described.

Figure 6:
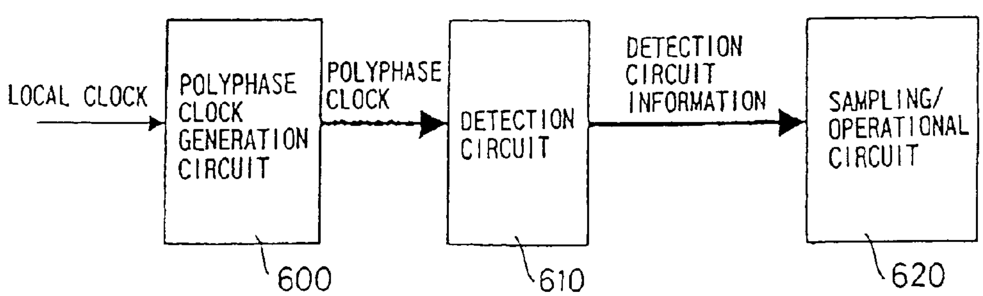
FIG. 6 is a block diagram showing a schematic configuration of a bit synchronizing circuit of the third embodiment.

A schematic configuration of the third embodiment is shown in a block diagram of FIG. 6. As shown in FIG. 6, this configuration comprises a sampling/operational circuit 620 for sampling outputs from a detection circuit 610 a plurality of times and operating the sampled values at latter stages of a polyphase clock generation circuit 600 (corresponding to the polyphase clock generation circuit 100 of the first embodiment) and the detection circuit 610 (corresponding to the detection circuit 110 of the first embodiment). Here, in the same way as the first embodiment as described above, the polyphase clock generation circuit 600 can comprise a plurality of detection circuits and the detection circuit 610 can comprise a plurality of D flip-flops.

That is to say the configuration of this embodiment samples the outputs from the detection circuit 610 a plurality of times to suppress an unstable operation due to the occurrence of metastability and performs an operation at the sampling/operational circuit 620 so as to take a mean value of the sampled outputs. Then the configuration of this embodiment determines what clock has a phase shift of a cycle of the bit rate or a cycle of the input clock.

As described above, the configuration provided with a sampling/operational circuit 620 as described above can determine what clock has a phase shift of a cycle of the bit rate or a cycle of the input clock, based on the operation result of the sampling/operational circuit 620, therefore, can realize a stable circuit configuration in which an unstable operation due to the occurrence of metastability hardly occurs, by sampling several times the outputs from the detection circuit 610 in the sampling/operational circuit 620 and carrying out the operation of averaging the values as described above.

In the first to third embodiments described above, the inconvenience can be expected that the output from the detection circuit is changed frequently due to disturbance factors such as noise or the like resulting in the unstable operation of the entire circuit. To prevent such an inconvenience the outputs from the detection circuit (110, 210 to 216, 501 and 610) should be maintained for a certain cycle of time without changing frequently so that the stable operation of the circuit can be achieved. That is to say, by having a configuration that can maintain the output from the detection circuit for a certain cycle of time to be updated at certain set intervals, the inconvenience of frequent change of the outputs from the detection circuit due to disturbance factors such as noise can be prevented to acquire a stable operation of the circuit without frequent changes of this type.

In addition, by having a configuration that maintains the outputs from the detection circuit at the time of the bit data reception, a stable operation of the circuit can be acquired at the time of the bit data reception.

Fourth Embodiment

Figure 7:
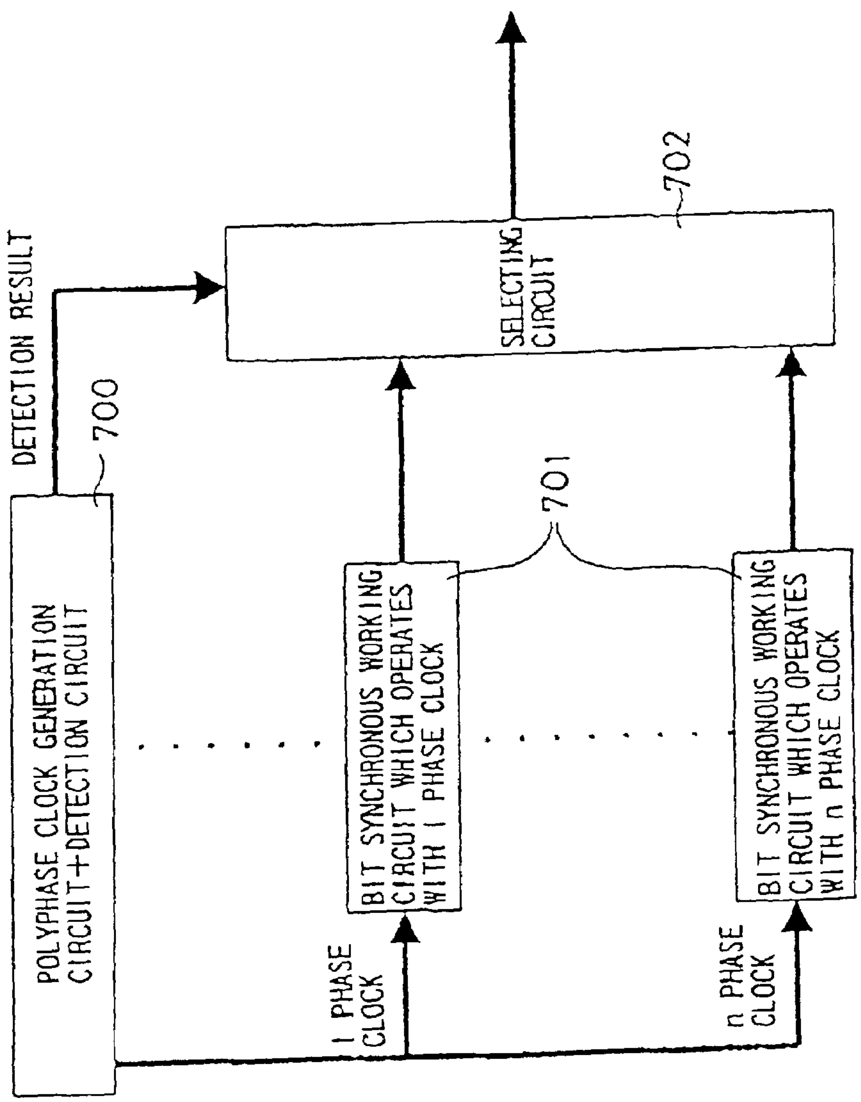
FIG. 7 is a block diagram showing a schematic configuration of a bit synchronizing circuit of the fourth embodiment.

A bit synchronizing circuit including a bit synchronous working circuit for performing the bit synchronizing operation as the fourth embodiment is described in reference to FIG. 7.

As shown in FIG. 7, the bit synchronizing circuit of this embodiment comprises any one circuit 700 of the first to third embodiments described above, and further a plurality of bit synchronous working circuits 701 to which a polyphase clock from the polyphase clock generation circuit of that circuit 700 is inputted, for performing the bit synchronizing operation at different phases, respectively, and a selection circuit (selector) 702 for selection from among outputs from the plurality of bit synchronous working circuit, based on a detection result of the detection circuit of the circuit 700.

The circuit 700 may comprise the polyphase clock generation circuit and the detection circuit, such as the first embodiment, may include a logical product circuit and a latch circuit such as the second embodiment or may include an operational circuit such as the third embodiment. Therefore, the detection result in the configuration including a logical product circuit and a latch circuit, such as the second embodiment, is gained through the latch circuit and the detection result of the configuration including an operation circuit such as the third embodiment is gained through an operational circuit.

In this embodiment, the polyphase clock generation circuit can also comprise a plurality of delay circuits in the same way as the first embodiment as described above, while the detection circuit can comprise a plurality of D flip-flops.

That is to say, in this embodiment, the bit synchronizing circuit includes several bit synchronous working circuits 701 in such a way that a bit synchronous working circuit operating at the n−2 phase, a bit synchronous working circuit operating at the n−1 phase, a bit synchronous working circuit operating at the n phase and a bit synchronous working circuit operating at the n+1 phase (n is an integer), more concretely, for example, a bit synchronous working circuit operating with a four phase clock, a bit synchronous working circuit operating with a five phase clock, a bit synchronous working circuit operating with a six phase clock and so forth are included at the time when circuits of the embodiments are actually incorporated as described above. Then a polyphase clock generated by the polyphase clock generation circuit (the delay circuits) of the circuit 700 is inputted to those bit synchronous working circuits 701 so as to operate respectively bit synchronous working circuits 701. In this way, by utilizing data describing which clock has a delay of one cycle among the clocks detected by the detection circuit of the circuit 700, selection is made from among the operating bit synchronous working circuits 701 to is made to utilize the output data therefrom.

In FIG. 7, as a bit synchronous working circuit 701, a bit synchronous working circuit 7011 operating with a 1 phase clock and a bit synchronous working circuit 701*n* operating with a n phase clock are shown (1 and n are both integers).

The phases for operating the bit synchronizing circuits are denoted as n−2 phase, n−1 phase, n phase, n+1 phase and so forth in the above description, which may be configured so as to use only odd numbers of phases to increase the jitter tolerance amount.

As described above, according to this embodiment, since the configuration comprises a plurality or bit synchronous working circuits and a selecting circuit as described above, which bit synchronous working circuit is utilized can be selected at the selecting circuit, based on the detection result of the detection circuit and the phase shift amount (the amount of the delay) of the polyphase clock can be easily optimized.

When including so many bit synchronous working circuits as this the circuit scale cannot help but become too large, therefore, by sharing whatever can possibly be shared between those bit synchronous working circuits, the circuit scale can be reduced.

Fifth Embodiment

A bit synchronizing circuit including a bit synchronous working circuit which performs a bit synchronizing operation, of which the circuit configuration is able to be simplified more than the fourth embodiment described above, is described in reference to FIGS. 8 to 10 as the fifth embodiment.

Figure 8:
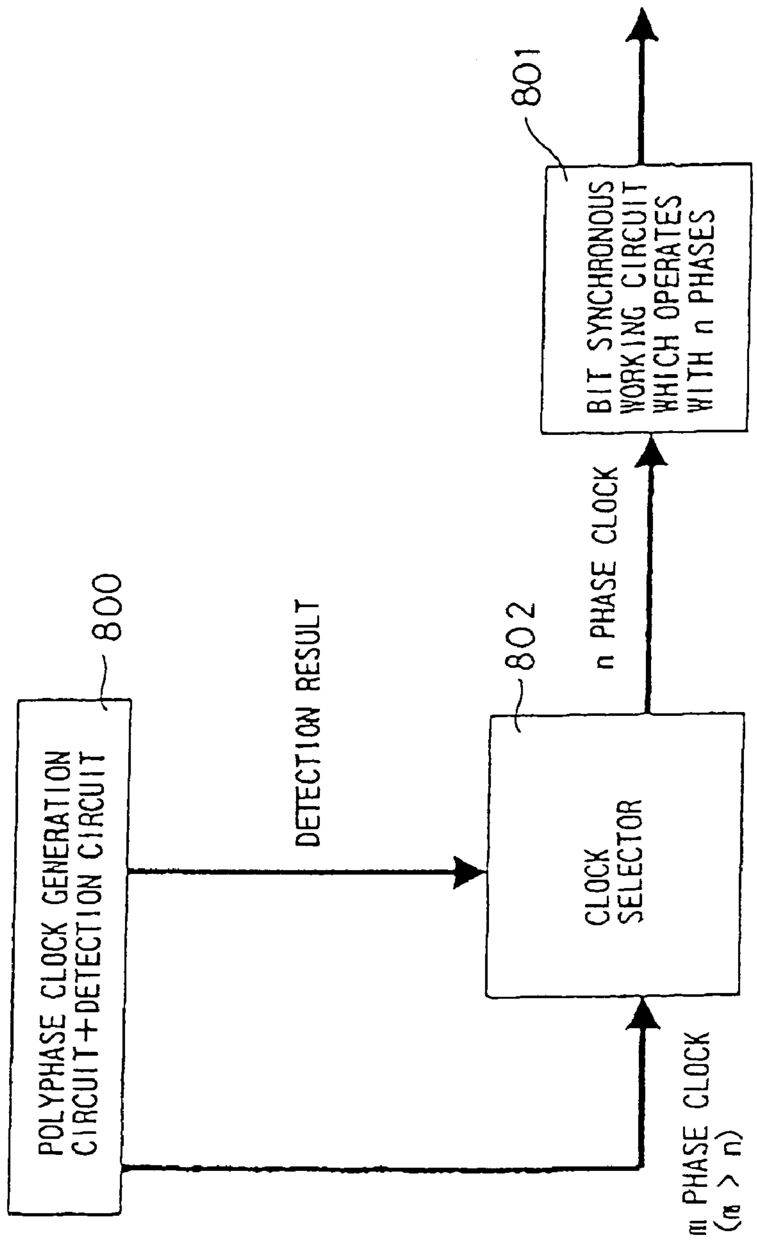
FIG. 8 is a block diagram showing a schematic configuration of a bit synchronizing circuit of the fifth embodiment.

As shown ir FIG. 8, the configuration is provided with any one circuit 600 of the first to third embodiments, and further a clock selecting circuit (clock selector) 802, to which a polyphase clock is inputted from the polyphase clock generation circuit of the circuit 800, which carries out selection among the outputted polyphase clocks based on the detection result from the detection circuit of the circuit 800. At a latter stage of the clock selector 802, a bit synchronous working circuit 801, which operates with the clock of the phase outputted from the clock selector 802, is connected.

The circuit 800 may comprise the polyphase clock generation circuit and the detection circuit, as shown in the first embodiment, may comprise a logical product circuit and a latch circuit as shown in the second embodiment or may comprise an operational circuit as shown in the third embodiment. Therefore, the detection result in the configuration including a logical product circuit and a latch circuit, as the second embodiment, is gained through the latch circuit, and the detection result of the configuration, including an operations circuit, such as the third embodiment, is gained through an operational circuit.

In this embodiment, the polyphase clock generation circuit can also comprise a plurality of delay circuits in the same way as that of the first embodiment, while the detection circuit can comprise a plurality of D flip-flops.

That is to say, this embodiment includes a bit synchronous working circuit operating with the n phase (n is an integer) as shown in FIG. 8, produces (generates) the m phase clock (m is an integer satisfying m>n) at the polyphase clock generation circuit (the delay circuits) of the circuit 800 as well as selects and outputs the n phase clock which is the clock or operating the bit synchronous working circuit 801 at the latter stage of the clock selector 802 from the inputted m phase clock, based on the data from the detection circuit of the circuit 800.

Figure 9:
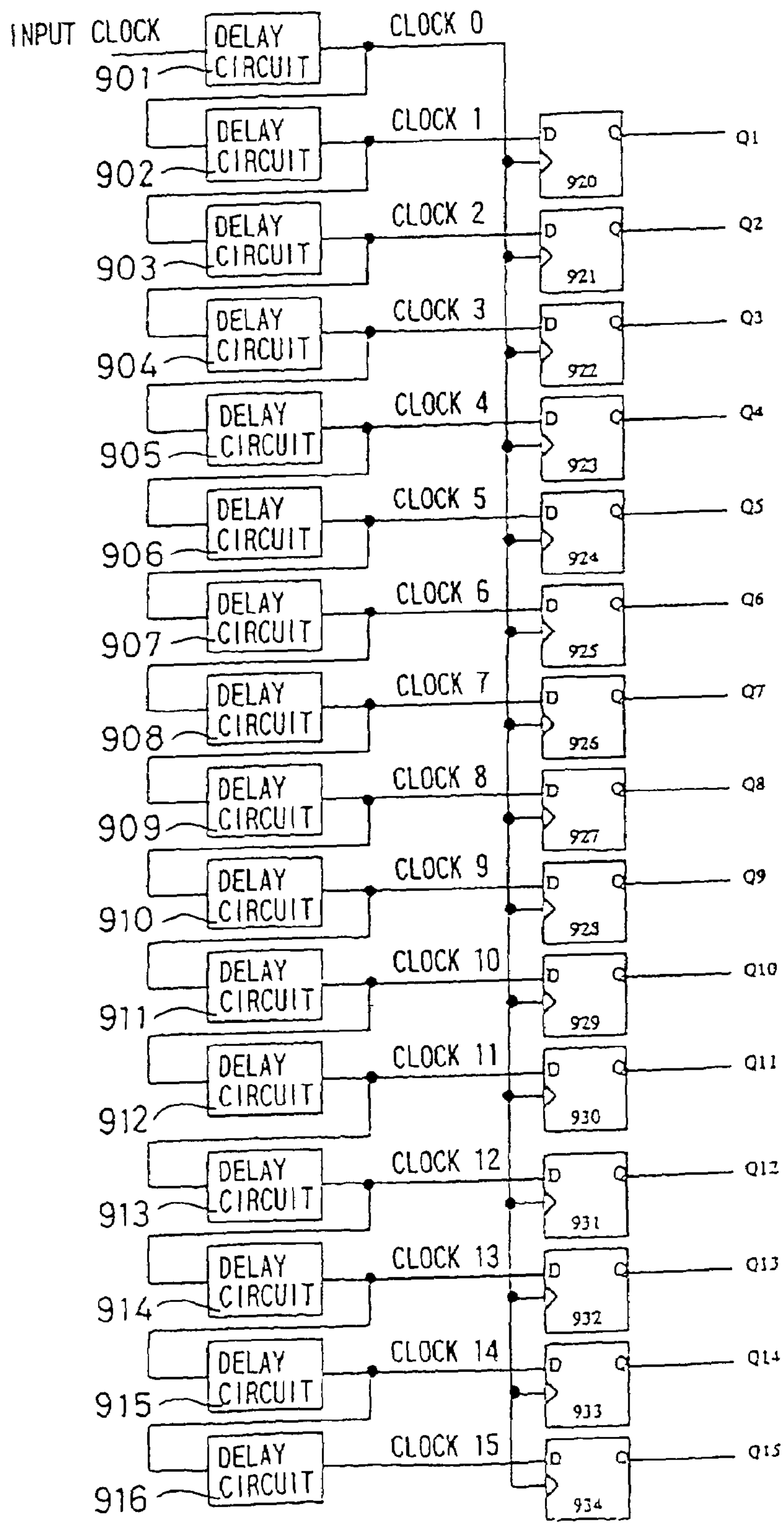
FIG. 9 is a block diagram showing a circuit configuration in more detail of the circuit 800 of the bit synchronizing circuit of FIG. 8.

A more concrete example of the circuit 800 is shown in a block diagram of FIG. 9.

As shown in FIG. 9, in the case of the bit synchronous working circuit 801 which needs a polyphase clock, e.g., a four phase polyphase clock, the configuration comprises delay circuits 901 to 916 in a sixteen stage configuration and corresponding detection circuits 920 to 934 in order to supply a four phase clock. The configuration shown in FIG. 9 is gained by increasing the numbers of the delay circuits and D flip-flops shown in FIG. 2 of the first embodiment.

Figure 10:
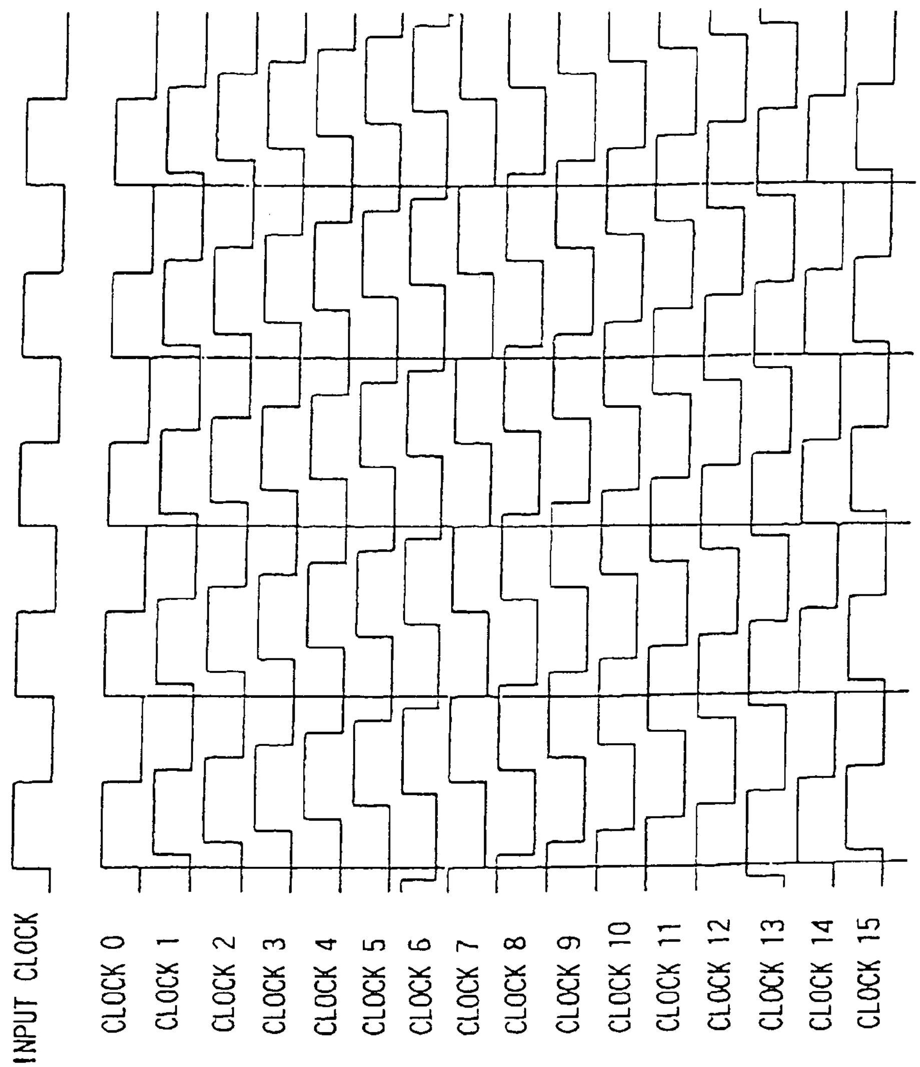
FIG. 10 is a diagram showing a clock waveform of a polyphase clock with the configuration of FIG. 8.
Figure 11:
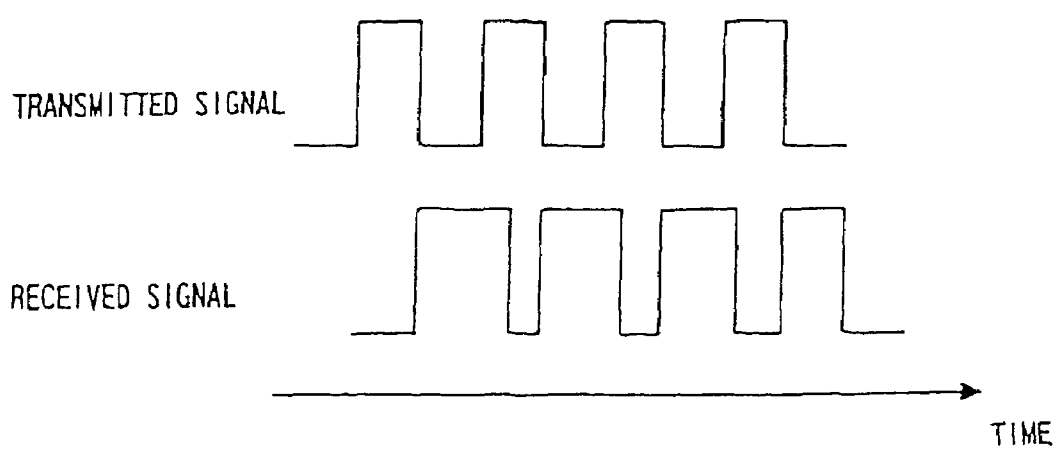
FIG. 11 is a diagram showing a signal waveform of transmission and reception when a bias occurs in the pulse width of the signal before the time that the amplifier of an optical receiver is stabilized.

The outputs from those delay circuits 901 to 916 are shown in a clock waveform diagram of FIG. 10. An output value of Q1 to Q15 in the case where those outputs are inputted to the detection circuits 920 to 934 is denoted as "00000011111110." The clock of the phase delayed by one cycle of the clock from this output value is clock 14. Since clock 0 to clock 14 comprise one cycle, the bit synchronizing circuit can be operated by dividing the value into four phases such as clock 0, clock 3, clock 8 and clock 12 and by inputting those divided clocks into four phases into the bit synchronizing circuit.

As described above, according to this embodiment, since the configuration is provided with the clock selector 802 as described above, by connecting the bit synchronous working circuit 801 which performs the bit synchronizing operation to the latter stage of the clock selector 802 to output the clock of the phase which is necessary for the operation of the bit synchronous working circuit 801, from the clock selector 802, the bit synchronizing circuit can be configured with a single bit synchronous working circuit 801 in order to simplify the circuit configuration and to reduce the cost.

In any circuit configuration of the first to fifth embodiments described above, a digital circuit can also be configured to implement a bit synchronizing circuit of high quality at an inexpensive cost.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A bit synchronizing circuit used for a reception circuit for serial communication, comprising:
- a polyphase clock generation circuit for generating a plurality of clocks which are out of phase with each other by a regular interval, based on an input clock, the polyphase clock generation circuit including a plurality of delay circuits connected in series and the first one of said plurality of delay circuits receiving the input clock, wherein each of said plurality of delay circuits generates one of said plurality of clocks;
- a detection circuit for detecting which clock has a phase shift of an integral multiple of a clock cycle among the clocks generated by the polyphase clock generation circuit with respect to the clock generated by the first delay circuit that receives the input clock; and
- a clock selecting circuit to which a polyphase clock is inputted from the polyphase clock generation circuit and which selects an outputted polyphase clock based on a detection result from the detection circuit.

2. The bit synchronizing circuit of claim 1, wherein the plurality of delay circuits delay the input clock by almost the same amount of time.

3. The bit synchronization circuit of claim 1, wherein said detection circuit comprises a plurality of flip-flops, each flip-flop having an input for said clock generated by said first delay circuit and an input for a respective clock among the clocks generated by the the remaining delay circuits.

4. A bit synchronizing circuit used for a reception circuit for serial communication, comprising:
- a polyphase clock generation circuit for generating a plurality of clocks which are out of phase with each other by a regular interval, based on an input clock, the polyphase clock generation circuit including a plurality of delay circuits connected in series and the first one of said plurality of delay circuits receiving the input clock, wherein each of said plurality of delay circuits generates one of said plurality of clocks;
- a detection circuit for detecting which clock has a phase shift of an integral multiple of a clock cycle among the clocks generated by the polyphase clock generation circuit with respect to the clock generated by the delay circuit that delays the input clock;
- a logic circuit to which an output from the detection circuit is inputted; and
- a latch circuit to which an output from the logic circuit is inputted and of which an output is inputted to the logic circuit.

5. The bit synchronizing circuit of claim 4, wherein the data of the latch circuit is cleared with a constant timing.

6. The bit synchronizing circuit of claim 4, wherein an output from the detection circuit is held for a constant cycle time and is updated at each constant time unit.

7. The bit synchronizing circuit of claim 6, wherein the output from the detection circuit is held at the time of bit data reception.

8. The bit synchronizing circuit of claim 4, comprising:

a clock selecting circuit to which a polyphase clock is inputted from the polyphase clock generation circuit and which selects an outputted polyphase clock based on a detection result from the detection circuit.

9. The bit synchronizing circuit of claim 4, wherein the plurality of delay circuits delay the input clock by almost the same amount of time.

10. A bit synchronizing circuit used for a reception circuit for serial communication, comprising:

a polyphase clock generation circuit for generating a plurality of clocks which are out of phase with each other by a regular interval, based on an input clock, the polyphase clock generation circuit including a plurality of delay circuits connected in series and the first one of said plurality of delay circuits receiving the input clock, wherein each of said plurality of delay circuits generates one of said plurality of clocks;

a detection circuit for detecting which clock has a phase shift of an integral multiple of a clock cycle among the clocks generated by the polyphase clock generation circuit with respect to the clock generated by the first delay circuit that receives the input clock; and an operational circuit for sampling an output from the detection circuit a plurality of times to generate a plurality of sampled values to carrying out an operation on the plurality of sampled values.

11. The bit synchronizing circuit of claim 10, wherein an output from the detection circuit is held for a constant cycle time and is updated at each constant time unit.

12. The bit synchronizing circuit of claim 10, comprising:

a clock selecting circuit to which a polyphase clock is inputted from the polyphase clock generation circuit and which selects an outputted polyphase clock based on a detection result from the detection circuit.

13. The bit synchronizing circuit of claim 10, wherein the plurality of delay circuits delay the input clock by almost the same amount of time.

14. A bit synchronizing circuit used for a reception circuit for serial communication, comprising:

a polyphase clock generation circuit for generating a plurality of clocks which are out of phase with each other by a regular interval, based on an input clock, the polyphase clock generation circuit including a plurality of delay circuits connected in series and the first one of said plurality of delay circuits receiving the input clock, wherein each of said plurality of delay circuits generates one of said plurality of clocks;

a detection circuit for detecting which clock has a phase shift of an integral multiple of a clock cycle among the clocks generated by the polyphase clock generation circuit with respect to the clock generated by the first delay circuit that receives the input clock;

a plurality of bit synchronous working circuits to which a polyphase clock is inputted from the polyphase clock generation circuit so that a bit synchronizing operation is carried out at each different phase; and a selecting circuit for selecting outputs from the plurality of bit synchronous working circuits, based on the detection result of the detection circuit.

15. The bit synchronizing circuit of claim 14, wherein the plurality of delay circuits delay the input clock by almost the same amount of time.

* * * * *